(12) United States Patent
Paden et al.

(10) Patent No.: US 11,750,054 B2
(45) Date of Patent: Sep. 5, 2023

(54) MODULATED LITZ WIRE CONSTRUCTION FOR HIGH POWER-DENSITY MOTORS

(71) Applicant: LAUNCHPOINT ELECTRIC PROPULSION SOLUTIONS, INC., Goleta, CA (US)

(72) Inventors: Bradley E. Paden, Goleta, CA (US); Michael R. Ricci, Camarillo, CA (US); David B Paden, Goleta, CA (US); Brian J. Clark, Santa Barbara, CA (US); Zachary J. Marshall, Ventura, CA (US)

(73) Assignee: LaunchPoint Electric Propulsion Solutions, Inc., Goleta, CA (US)

( * ) Notice: Subject to any disclaimer, the term of this patent is extended or adjusted under 35 U.S.C. 154(b) by 232 days.

(21) Appl. No.: 17/322,659

(22) Filed: May 17, 2021

(65) Prior Publication Data

US 2021/0359564 A1 Nov. 18, 2021

Related U.S. Application Data

(60) Provisional application No. 63/026,245, filed on May 18, 2020.

(51) Int. Cl.
*H02K 3/14* (2006.01)
*H02K 1/16* (2006.01)

(52) U.S. Cl.
CPC ............... *H02K 3/14* (2013.01); *H02K 1/16* (2013.01)

(58) Field of Classification Search
CPC .. H02K 1/16; H02K 3/02; H02K 3/14; H02K 3/47; H02K 21/24; H02K 15/0478; H02K 15/12; H02K 2213/03

USPC ........ 310/43, 54, 64, 156.32, 179, 180, 208, 310/266, 268

See application file for complete search history.

(56) References Cited

U.S. PATENT DOCUMENTS

| | | | | |
|---|---|---|---|---|
| 5,723,933 A | * | 3/1998 | Grundl | H02K 29/06 310/266 |
| 7,525,230 B1 | * | 4/2009 | Gabrys | H02K 21/14 310/260 |
| 7,671,504 B2 | * | 3/2010 | Rohrer | H02K 3/04 310/179 |
| 8,823,238 B2 | * | 9/2014 | Greaves | H02K 3/47 310/268 |
| 8,933,607 B1 | * | 1/2015 | Gabrys | H02K 21/14 310/179 |
| 9,449,754 B2 | * | 9/2016 | Graham | H01F 41/10 |
| 10,230,321 B1 | * | 3/2019 | Papini | H02P 9/006 |
| 2005/0108870 A1 | * | 5/2005 | Harada | H02K 15/0414 29/606 |
| 2009/0200889 A1 | * | 8/2009 | Halstead | H02K 3/04 310/208 |
| 2010/0117481 A1 | * | 5/2010 | Greaves | H02K 3/47 29/596 |
| 2010/0253161 A1 | * | 10/2010 | Kuroyanagi | H02K 1/16 310/44 |

(Continued)

*Primary Examiner* — Rashad H Johnson
(74) *Attorney, Agent, or Firm* — Felix L. Fischer (57) ABSTRACT

A modulated litz wire wherein the braid of a litz wire is varied along its length such that bulkier sections are located at the end-turns of a motor, while more compact parallel stranded sections are located in stator slots or magnetic gaps. Variations may include parallel stranded sections replaced with a longitudinal twist for improved handling or improved current sharing in strands.

15 Claims, 6 Drawing Sheets

(56) References Cited

U.S. PATENT DOCUMENTS

| | | | |
|---|---|---|---|
| 2016/0365755 A1* | 12/2016 | Long | H02K 15/0478 |
| 2019/0296596 A1* | 9/2019 | Iwaya | H01B 7/00 |
| 2019/0363597 A1* | 11/2019 | Takeuchi | H02K 3/04 |
| 2021/0359564 A1* | 11/2021 | Paden | H02K 3/14 |
| 2022/0352775 A1* | 11/2022 | Pollock | H02K 3/04 |

* cited by examiner

MODULATED LITZ WIRE CONSTRUCTION FOR HIGH POWER-DENSITY MOTORS

REFERENCES TO RELATED APPLICATIONS

This application claims priority of U.S. Provisional application Ser. No. 63/026,245 filed on May 18, 2020 entitled MODULATED LITZ WIRE CONSTRUCTION FOR HIGH-POWER-DENSITY MOTORS having a common assignee with the present application, the disclosure of which is incorporated herein by reference.

TECHNICAL FIELD

The present invention relates to litz wire constructions. More specifically, the present invention relates to varied wire constructions of combined braided, twisted, and parallel strands used in motor windings and other electromagnetic devices.

BACKGROUND

Conductors carrying alternating currents are subject to eddy-current and proximity effects that increase the impedance of the conductor relative to its direct-current (DC) impedance. These effects may be mitigated by using the complex twisting constructions employed in litz wire. Such effects are described in, for example, "Analytical Model for Effects of Twisting on Litz-Wire Losses" by Sullivan et al. as published at the 2014 IEEE 15th Workshop on Control and Modeling for Power Electronics (COMPEL) 2014 Jun. 22 (pp. 1-10). IEEE, the contents of which are herein incorporated by reference.

Litz wire is typically available in many different configurations, though all configurations are typically uniform along their length and commonly consist of individually insulated strands twisted or braided in such a way so as to improve the uniformity of current sharing among the strands. Examples of litz wire may be found in the products of New England Wire Technologies Inc. of Lisbon, N. H., and which includes the manufacture of eight types of litz wire which are round or rectangular. It is known that other cross-sectional shapes are possible, though lengthwise uniformity is typical.

Known litz wire configurations often provide desirable characteristics such as equal distributions of currents in individually insulated wires, while other twisted or braided constructions may also have improved current distributions. For example, in "Current Sharing Analysis of Parallel Strands in Low-Voltage High-Speed Machines" by van der Geest et al. as published in IEEE Transactions on Industrial Electronics, Volume: 6, Issue 6, June 2014, the contents of which are herein incorporated by reference, it is shown that a simple twisting of insulated conductors serves to improve current sharing in an iron-core motor. It is also known that even uninsulated stranded constructions have improved current distributions when braided, twisted, or formed into litz-like constructions.

It is also known that uniform current sharing reduces ohmic losses, also known as Joule heating, in motors and other electromagnetic devices. Accordingly, wires comprised of insulated and uninsulated strands in litz, braided, and twisted configurations are common in motors and other electromagnetic devices. Improved current sharing is also accomplished with conductors that are not made from wire. For example, conductors made from insulated rectangular bars in the so-called "Roebel Bar" as described in U.S. Pat. No. 1,144,252 issued to Roebel, the contents of which are herein incorporated by reference.

While braided wire has the benefit of improving current distributions, especially with insulated strands, the braiding itself physically increases the overall volume of the wire. This is due to the attributes of braided wire having more space between strands relative to wires formed from parallel strands, or relative to wires that have a minimal amount of twist. In other words, braided wires have a lower fraction of copper in a cross section and this attribute is consistent along the length of such known braided wires. Moreover, the strands within a given braided wire do not all intersect a cross-section orthogonally. This this detrimentally decreases a characteristic known as "fill factor" in the art of motor design and which is the ratio of the cross-sectional area of the amount of material inside of a stator slot compared to the amount of total available space of a bare slot. A higher fill factor allows for increased conductor area or decreased slot area to reduce losses. During manufacturing, the fill factor therefore affects the ability to insert the wire and other materials into the slots. Moreover, litz wires may be bulkier than parallel stranded wires and reduce the effective fill factor in mechanically restricted areas such as magnetic gaps or motor stator slots. Accordingly, competing objectives in the use of litz wire exists such that the complex twisting improves current distribution, but decreases the fill factor.

SUMMARY

The implementations disclosed herein provide a modulated litz wire having a multiple strand conductor including at least a first section and a second section. The first section is configured as one of litz wire, twisted wire, braided wire or parallel stranded wire. The second section is configured as one of litz wire, twisted wire, braided wire or parallel stranded wire differing from the first section to provide an altered fill factor or an altered current redistribution or a combination of both.

In one aspect, the present invention provides a modulated litz wire including: a braided conductor including at least a first section and a second section, the first section including a braid that varies relative to the second section to improve the performance of motors and other devices that employ alternating currents.

BRIEF DESCRIPTION OF THE DRAWINGS

The present invention will now be described by reference to the following figures, in which identical reference numerals refer to identical elements and in which.

DETAILED DESCRIPTION

As used herein, the term "braid" or "braided" refers to any particular pattern of litz wire, twisted wire, braided wire, or parallel stranded wire. The term "litz wire" refers to any twisted wire, braided wire, or parallel stranded wire arranged to have improved current distribution with insulated strands. The term "uninsulated litz wire" refers to litz wire made from uninsulated strands. The term "modulated litz wire" refers to strands of conductor with varying sections of any combination of litz wire, twisted wire, braided wire or parallel stranded wire.

It should be noted that in motor windings and other electromagnetic devices the fill factor requirement varies, or is "modulated," along the length of a winding. The present implementations exploit such a modulated fill-factor requirement in order to increase the performance of motors and other electromagnetic devices. There is no requirement in motor windings that the braid be constant along the length of the wire and thus the braid may be modulated as well. For example, the pitch of the braid may be varied along the length of the wire. Twisted sections may be interspersed between braided sections and any form of parallel stranded sections may be interspersed between sections of litz constructions. There are a wide range of braids that may be created through the use of suitable design software, braiding machine control software, and braiding machine design. Older style braiding machines can be programmed mechanically by choice of gears. Any given implementation may of course vary. For example, end turns in motors may use a bulkier braid to support increased current distributions while less bulky braids or parallel strands may be used in the motor slots where space is more restricted.

For purposes of the present implementations, litz wires and other braided wires are manufactured with computer-controlled braiding machines that preferably guide round conductors into a braid. Suitable braiding machines are those such as manufactured by Wardwell Braiding Company of Central Falls, R. I. and Steeger USA, a division of Machine Solutions Inc. of Inman, S. C. These braiding machines are used by litz wire manufacturers such as New England Wire Technologies Inc. of Lisbon, N. H.

Figure 1:
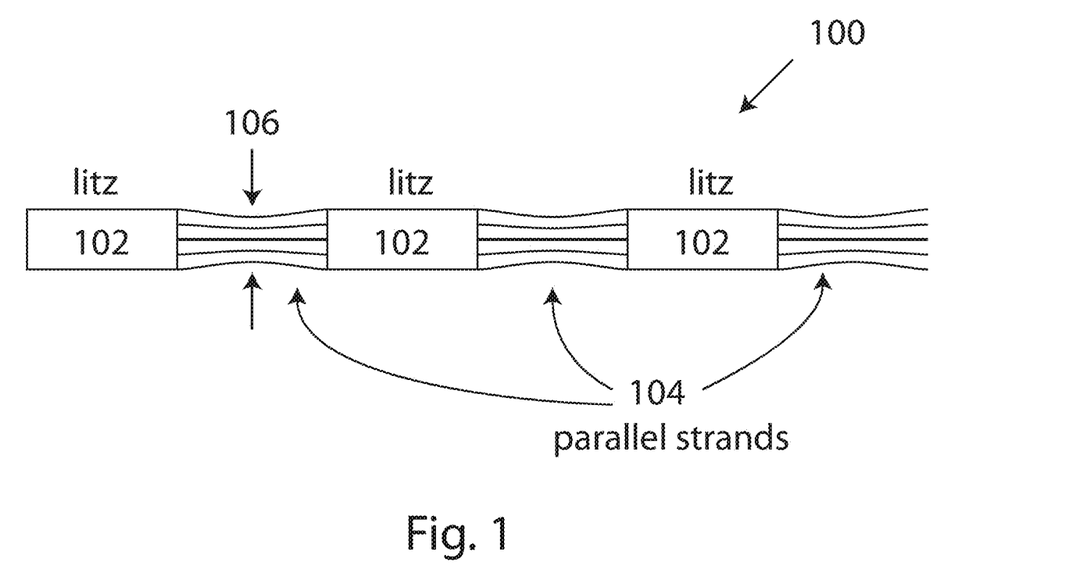
FIG. 1 is a modulated litz wire in accordance with a first implementation of the present invention.

With regard to FIG. 1, a modulated litz wire 100 is shown to include a braid that is modulated along its length. This modulation involves alternating sections where a first section of litz braid 102 is provided intermittently with a second section of parallel strands 104. A reduced cross-sectional area of the parallel stranded section is indicated by arrows 106 and is provided by the related reduction in bulkiness in a parallel stranded section versus a bulkier litz braid section. Thus the fill factor in the parallel stranded sections may be higher. It should be understood that there are various types of litz braids and therefore a multitude of possible cross-sectional variations. For example and as earlier mentioned, the pitch of the litz braid may be varied along the length of the litz wire. Likewise, the parallel strands may be skewed or slightly twisted in a manner consistent with the desired implementation. In this way, the cross-section of the modulated wire 100 will be varied along its length.

Figure 2:
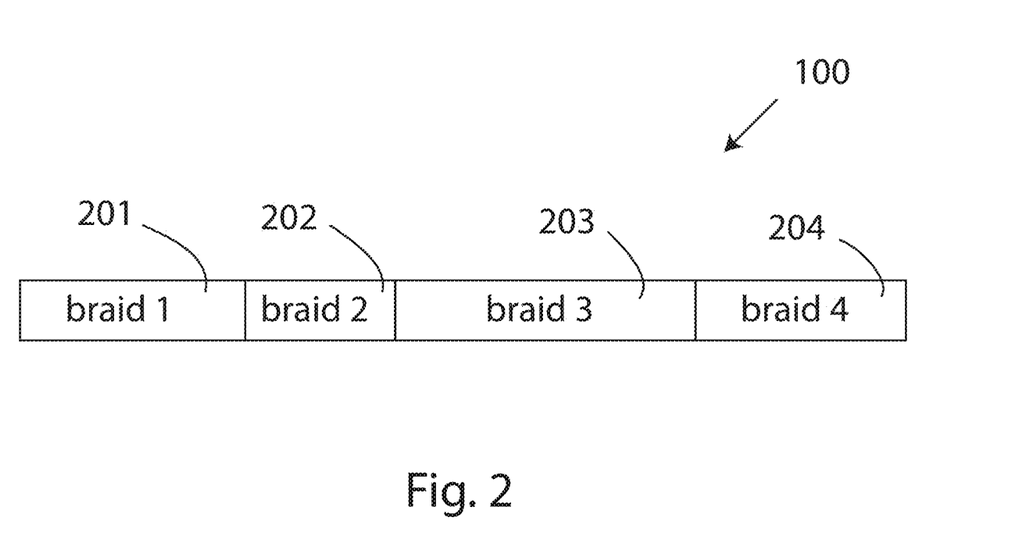
FIG. 2 is a modulated litz wire in accordance with a second implementation of the present invention.

With regard to FIG. 2, there is shown a generalized schematic of a modulated litz wire 100 that may include varying sections of any given type of litz braid along the entirety of the length of the modulated litz wire. In this manner, braid 1 through braid 4 are provided in sections 201, 202, 203 and 204. Sections 201, 202, 203 and 204 are shown as unequal in length in the drawings but may have equal length. It should also be understood that the characteristics of the braid in each section may also vary relative to one another in terms of pitch or the weave pattern or any desirable configuration for the given implementation. The pattern (e.g., changes to pitch, weave pattern, etc.) in any given modulated litz wire is preferably repeating.

Figure 3:
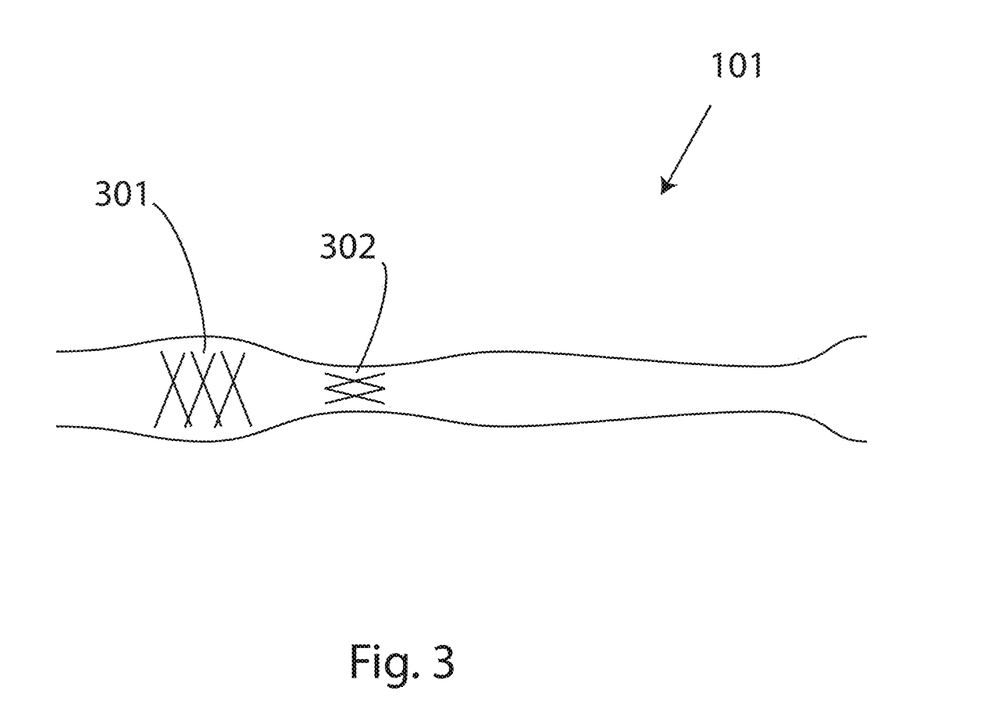
FIG. 3 is a modulated litz wire in accordance with a third implementation of the present invention.

Such variation in braid characteristics is illustrated generally by FIG. 3. Here, a modulated litz wire 101 is shown where the braid varies continuously along the length of the modulated wire as represented by braid patterns 301 and 302 at various locations in the overall length. The length of the sections of varying braid as previously described may be compressed in length based solely on the capability of the braiding machine. Manufacture of such a modulated litz wire may be aided by a programmable wire braiding machine as previously suggested. Varying the pitch and weave thereby correspondingly varies cross-sectional orthogonality.

Figure 4:
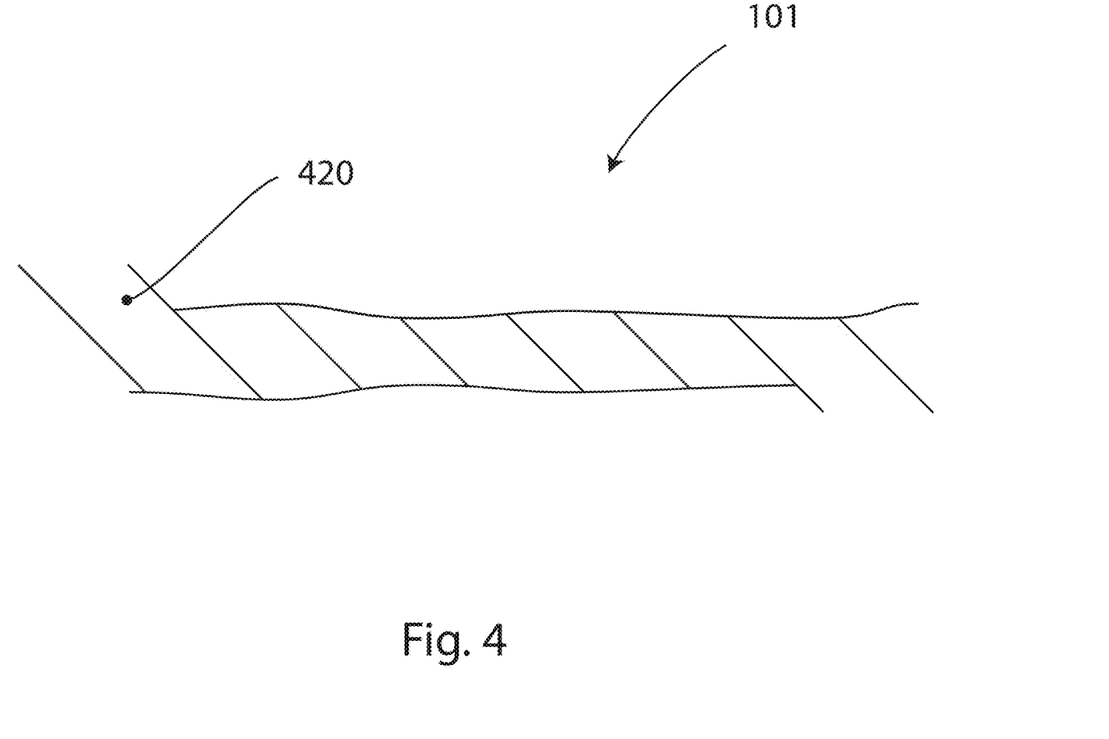
FIG. 4 is an illustration of an outer insulation for use in conjunction with a modulated litz wire of the present implementations.

With regard to FIG. 4, there is shown an exterior of a modulated litz wire 101 as shown in FIG. 3. As should be understood, the present inventive modulated litz wire may include a wrapping 420 such as, but not limited to, a polyimide film (e.g., DuPont™ Kapton® polyimide films). Such a wrapping may be particularly useful in holding parallel stranded sections together and during handling the finished wire. The wrapping also provides electrical insulation. Other insulation wrapping systems are possible including shrink-fit tubing. Advantageously, the shrink-fit type of wrapping may be segmented and only cover certain sections of the wire such as end-turns in a motor.

Figure 5:
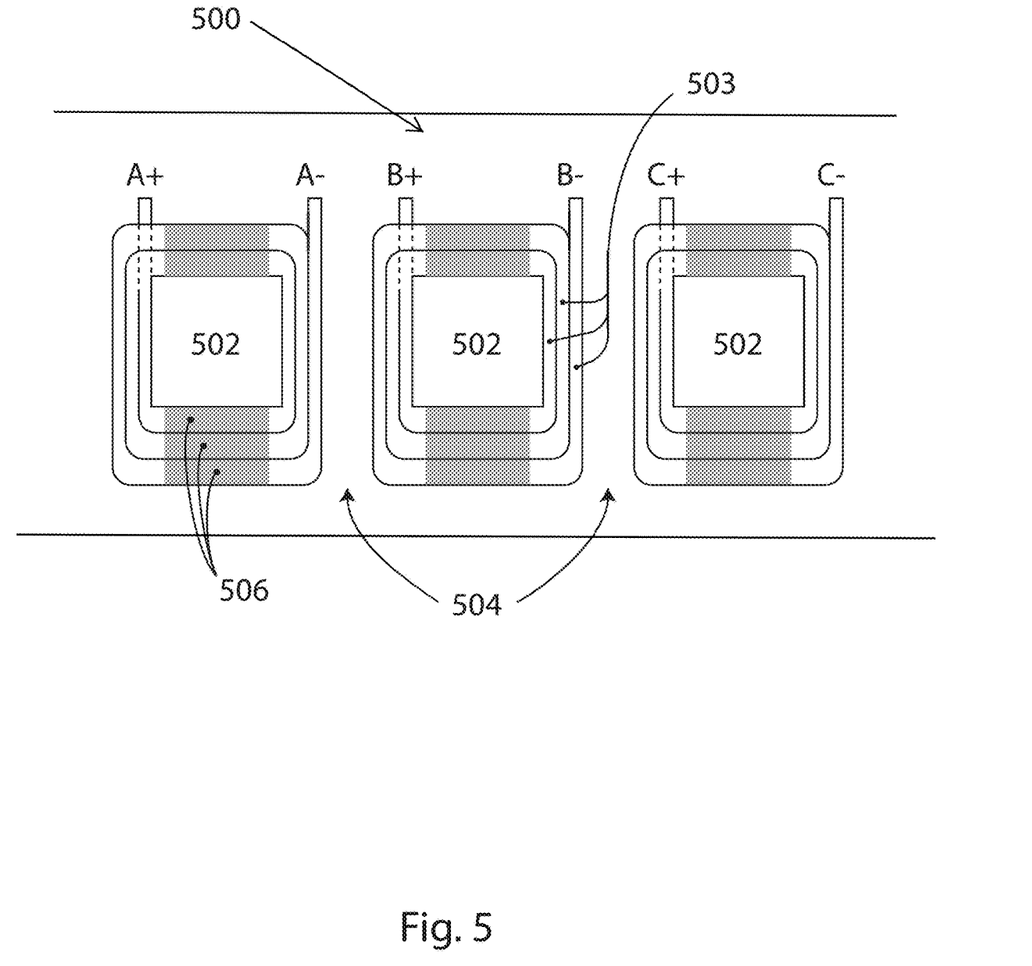
FIG. 5 is an illustration depicting a stator of a linear motor utilizing a modulated litz wire of the present implementations.

With regard to FIG. 5, there is shown a schematic depicting a stator 500 of a linear motor. Here, laminated iron teeth 502 are wound with modulated litz wire in accordance with the present invention. Parallel stranded sections 503 are shown within the stator slots 504 as the slot area is limited. It should be further understood that variations among any given stator implementation may require smaller or larger diameters of parallel stranded sections. Litz braid sections 506 are used on the end turns of the stator as the end turn area is less limited and the litz braid sections may therefore include an expanded cross section subject to the particular configuration dictated by the stator implementation.

As seen in the various implementations, a modulated litz wire is constructed as a multiple strand conductor including at least a first section and a second section. The first section is configured as one of litz wire, twisted wire, braided wire or parallel stranded wire. The second section is also configured as one of litz wire, twisted wire, braided wire or parallel stranded wire differing from the first section to provide an altered fill factor between the sections.

With continued reference to FIG. 5, it should be further noted that each parallel stranded section 503 may be replaced with a slightly twisted set of wire or other braid of varied pitch or pattern so as to increase current sharing and yet still achieve compact conductors within the slots. The resultant modulated litz wire implemented should be sufficient to cause current sharing among the wire strands, especially when the magnetic environment experienced by each strand averaged over the length of the strands is nearly equal among the strands. Three phases, A, B, and C are shown with their respective terminal connections A+, A−, B+, B−, C+, and C−. While a linear motor is suggested by FIG. 5, it should be noted that similar windings for rotary motor stators are also possible as understood by those skilled in the art without straying from the intended scope of the present invention.

Figure 6:
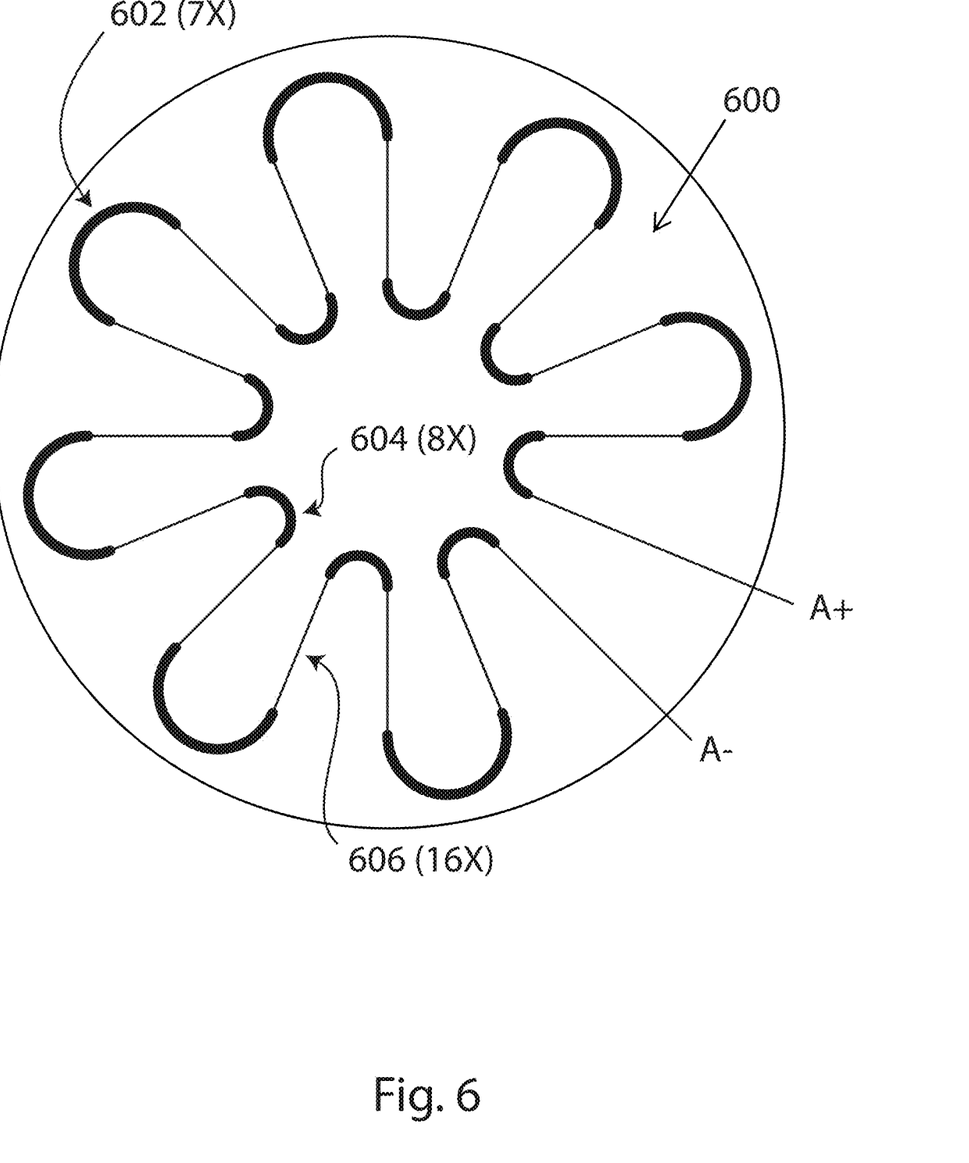
FIG. 6 is an illustration depicting a stator of an axial gap motor utilizing a modulated litz wire of the present implementations.

With regard to FIG. 6, there is shown a planar winding 600 for an axial-gap motor of the type described in U.S. Pat. No. 8,823,238 issued to Greaves et al., the contents of which are herein incorporated by reference. Here, the present invention is implemented in an axial-gap motor. The winding shown is for a single phase (phase A) of the motor where the terminals are labeled A+ and A−. The seven outer end-turns 602 and eight inner end-turns 604 each include sections of litz wire where the radial sections 606 that lay within the magnetic gap of the motor are parallel strands. The inner end-turn 604 is generally shorter than the outer end-turn 602, while the inner end-turn 604 may be formed of entirely parallel stranded wire to save space in this area. Further, the sixteen radial sections 606 may be replaced with slightly twisted wire or other braid to increase current sharing and yet still achieve compact windings in the magnetic gap. The number of radial sections and end turns will of course vary as is known in the art of motor design depending on the number motor poles and the winding design. It should therefore further be noted with regard that the inner and outer turns have differing lengths and may include differing braids (e.g., changes to pitch, weave pattern, etc.).

Figure 7:
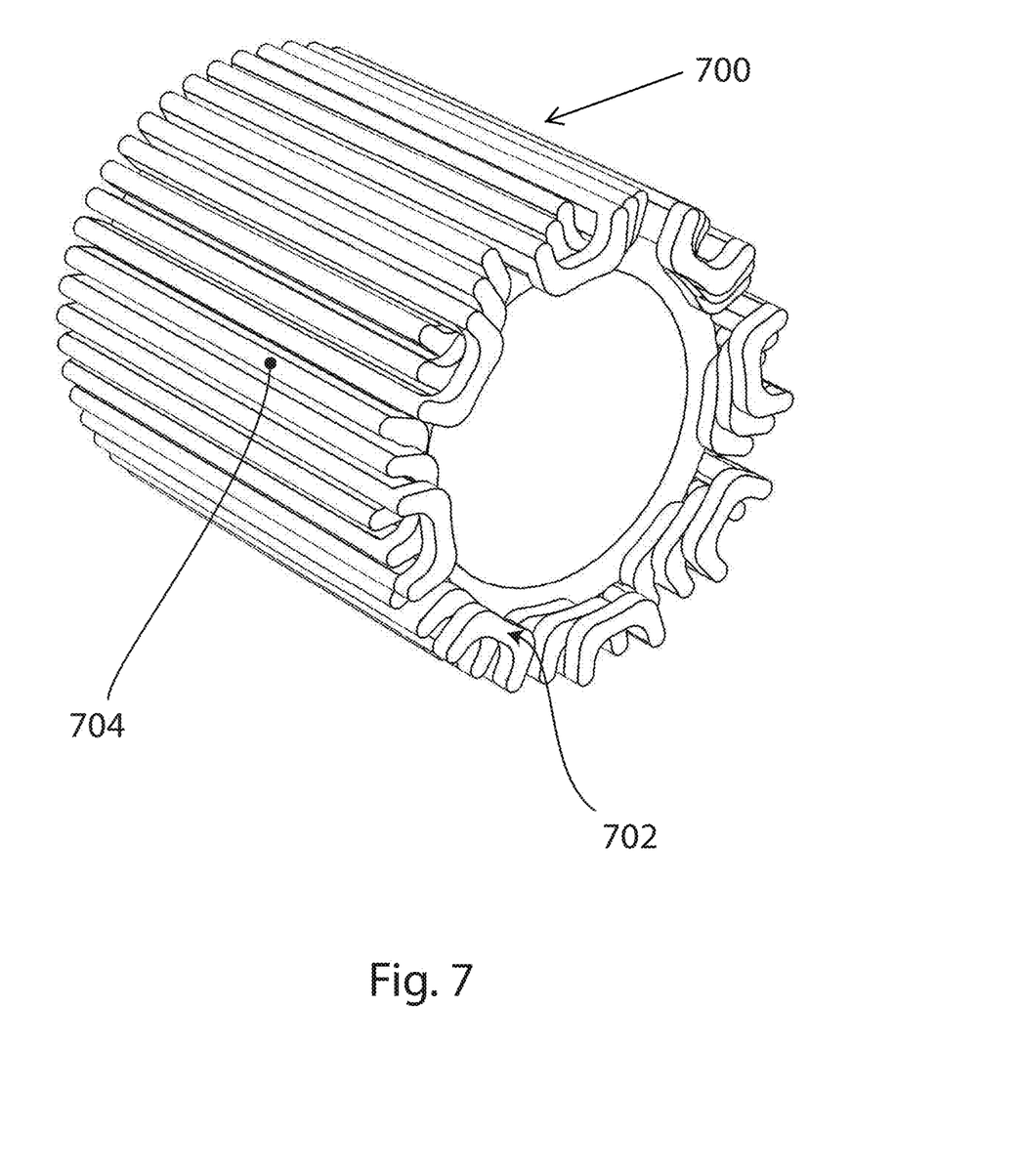
FIG. 7 is a perspective view depicting a stator of a high-performance motor utilizing a modulated litz wire of the present implementations.

With regard to FIG. 7, there is shown a stator 700 from a high-performance motor similar to that described in "Mechanical Design Considerations of an "Ironless," High-Specific-Power Electric Machine" by Chen et al. as published in IEEE Transactions on Transportation Electrification (Volume: 3, Issue: 4, December 2017), the contents of which are herein incorporated by reference. The motor disclosed in the Chen et al. publication employs litz wire with a uniform braid. An embodiment of an example motor would utilize the implementations of modulated litz wire disclosed herein such that a first braid section would be restricted to the use of the end turns 702 and use a differing second braid section, parallel strands for example, in the magnetic gap region 704.

In addition to the advantages outlined above, the modulated litz wire in accordance with the present invention provides improvements in the winding of motors as the patterning is a visual and tactile guide. The thicker braided sections of the modulated litz wire are more easily held by human assemblers and with tooling designed to hold the modulated litz wire.

A person understanding this invention may now conceive of alternative structures and embodiments or variations of the above all of which are intended to fall within the scope of the invention as defined in the claims that follow.

What is claimed is:

1. A modulated litz wire comprising:
a multiple strand conductor including at least a first section and a second section, said first section configured as one of litz wire, twisted wire, braided wire or parallel stranded wire and said second section configured as one of litz wire, twisted wire, braided wire or parallel stranded wire differing from the first section to provide an altered fill factor or an altered current redistribution effect or both.

2. The modulated litz wire as in claim 1, wherein at least one of said first or second sections include a litz braid interspersed with additional sections of an alternative braid.

3. The modulated litz wire as in claim 1, wherein said multiple strand conductor is formed from round conductors.

4. The modulated litz wire as in claim 2, wherein at least one of said first or second sections include a litz braid interspersed with sections of twisted or parallel strands.

5. A motor stator comprising:
a stator core; and
a modulated litz wire winding on the stator core.

6. The motor stator as defined in claim 5, wherein said modulated litz wire comprises a braided conductor including at least a first section and a second section, said first section including a braid having a different type relative to said second section.

7. The motor stator as defined in claim 5, wherein end turns of the modulated litz wire winding on the core are litz wire and a remainder of said modulated litz wire winding is a braid differing from said litz wire.

8. The motor stator as defined in claim 7 wherein the remainder of said modulated litz wire winding has a higher fill factor than the litz wire on the end turns.

9. The motor stator as defined in claim 5, wherein end turns of the modulated litz wire winding on the core are litz wire and a remainder of said modulated litz wire winding is parallel strands or twisted strands.

10. The motor stator as defined in claim 5 for use in a linear motor and the stator core comprises laminated iron teeth.

11. The motor stator as defined in claim 5 for use in an axial gap motor and the modulated litz wire winding comprises a planar winding.

12. The motor stator as defined in claim 11 wherein the planar winding comprises a plurality of outer end turns and a second plurality of inner end turns, said outer end turns and inner end turns joined by radial sections.

13. The motor stator as defined in claim 12 wherein said outer end turns and inner end turns have sections of litz wire and said radial sections having parallel strands.

14. The motor stator as defined in claim 12 wherein said outer end turns and inner end turns have sections of litz wire and said radial sections have twisted wire.

15. The motor stator as defined in claim 12 wherein said outer end turns have sections of litz wire and said inner end turns have parallel stranded wire.

* * * * *